US009584506B2

(12) United States Patent
Funayama

(10) Patent No.: US 9,584,506 B2
(45) Date of Patent: Feb. 28, 2017

(54) SERVER APPARATUS, INFORMATION PROCESSING METHOD, PROGRAM, AND STORAGE MEDIUM

(71) Applicant: CANON KABUSHIKI KAISHA, Tokyo (JP)

(72) Inventor: Hirotaka Funayama, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/720,604

(22) Filed: May 22, 2015

(65) Prior Publication Data

US 2015/0256532 A1   Sep. 10, 2015

Related U.S. Application Data

(62) Division of application No. 13/555,974, filed on Jul. 23, 2012, now abandoned.

(30) Foreign Application Priority Data

Jul. 28, 2011   (JP) .................. 2011-165634

(51) Int. Cl.
*H04L 29/06* (2006.01)
*G06F 21/33* (2013.01)
*H04L 12/14* (2006.01)

(52) U.S. Cl.
CPC .......... *H04L 63/083* (2013.01); *G06F 21/335* (2013.01); *H04L 12/14* (2013.01); *H04L 63/10* (2013.01); *H04L 63/101* (2013.01); *H04L 63/102* (2013.01); *H04L 63/105* (2013.01); *H04L 2463/101* (2013.01)

(58) Field of Classification Search
CPC ... H04L 63/101; H04L 63/102; H04L 63/105; H04L 12/14; G06F 21/335
See application file for complete search history.

(56) References Cited

U.S. PATENT DOCUMENTS

| | | | | |
|---|---|---|---|---|
| 7,650,505 B1* | 1/2010 | Masurkar | ............ | H04L 63/0846 713/176 |
| 7,730,523 B1* | 6/2010 | Masurkar | .............. | H04L 63/168 726/4 |
| 8,544,068 B2* | 9/2013 | Yates | .................... | H04L 9/3213 726/21 |
| 8,601,540 B2* | 12/2013 | Eddahabi | ................ | G06F 21/10 726/19 |
| 8,601,553 B1* | 12/2013 | Griffin | .................. | H04L 9/3236 709/227 |
| 8,793,509 B1* | 7/2014 | Nelson | .................. | G06F 21/335 380/227 |
| 2003/0051039 A1* | 3/2003 | Brown | ............... | G06Q 20/1235 709/229 |
| 2008/0083025 A1* | 4/2008 | Meijer | ................ | H04L 63/0807 726/9 |
| 2008/0294453 A1* | 11/2008 | Baird-Smith | .......... | G06F 21/10 705/1.1 |

(Continued)

*Primary Examiner* — James Turchen
(74) *Attorney, Agent, or Firm* — Canon U.S.A., Inc. IP Division

(57) ABSTRACT

An information processing method for a server apparatus controlling access based on a role of a user and a scope as authority held by an authorization token for realizing a unified license management structure that does not reduce an overall performance of a cloud service even if a plurality of services collaborate with the cloud service.

2 Claims, 15 Drawing Sheets

(56) References Cited

U.S. PATENT DOCUMENTS

| | | | |
|---|---|---|---|
| 2010/0031037 A1* | 2/2010 | Yami | G06F 21/82 713/168 |
| 2010/0198730 A1* | 8/2010 | Ahmed | G06F 17/30528 705/50 |
| 2011/0154465 A1* | 6/2011 | Kuzin | H04L 63/0815 726/9 |
| 2011/0209193 A1* | 8/2011 | Kennedy | G06F 21/55 726/1 |
| 2011/0265147 A1* | 10/2011 | Liu | H04L 63/08 726/4 |
| 2011/0321086 A1* | 12/2011 | Buchheit | H04N 21/23424 725/34 |
| 2012/0246336 A1* | 9/2012 | Sathish | G06F 9/5055 709/238 |
| 2012/0254957 A1* | 10/2012 | Fork | G06F 21/33 726/6 |
| 2013/0007846 A1* | 1/2013 | Murakami | H04W 12/08 726/4 |

* cited by examiner

FIG. 5

| USER ID | PASSWORD | TENANT ID | SURNAME | FIRST NAME | ASSIGNED ROLE |
|---|---|---|---|---|---|
| user1 | 4hfq9ph8ny | 1001AA | YAMADA | TARO | PRINT SERVICE PAID INTEGRATED SERVICE |
| user2 | 3qtyq8vyp | 1002AA | YAMADA | HANAKO | PAID INTEGRATED SERVICE |
| user3 | E9tuqprnt34 | 1002AA | SATO | ICHIRO | PRINT SERVICE |
| ... | | | | | |

FIG. 6

| TOKEN ID | SCOPE | USER ID |
|---|---|---|
| as234sfd5 | CHARGE-FREE INTEGRATED SERVICE | user1 |
| nzxvcvraeu1 | null | user2 |
| dafntj7sawe | PRINT SERVICE | user2 |
| asdfaq23e567 | null | user3 |

FIG. 7

| SCOPE | ROLE REFERENCE |
|---|---|
| PAID INTEGRATED SERVICE | YES |
| CHARGE-FREE INTEGRATED SERVICE | NO |
| PRINT SERVICE | YES |

FIG. 11

| URL | SCOPE |
|---|---|
| http://fee-based_service/* | PAID INTEGRATED SERVICE |
| http://free_service/* | CHARGE-FREE INTEGRATED SERVICE |
| http://print_service/* | PRINT SERVICE |
| ... | |

SERVER APPARATUS, INFORMATION PROCESSING METHOD, PROGRAM, AND STORAGE MEDIUM

CROSS-REFERENCE TO RELATED APPLICATIONS

This application is a Division of U.S. patent application Ser. No. 13/555,974, filed Jul. 23, 2012, which claims the benefit of Japanese Patent Application No. 2011-165634, filed Jul. 28, 2011, both of which are hereby incorporated by reference herein in their entirety.

BACKGROUND OF THE INVENTION

Field of the Invention

The present invention relates to a server apparatus, an information processing method, and a storage medium.

Description of the Related Art

In recent years, various cloud services have been provided in the Internet environment. Some cloud services collaborate to provide a new service.

Many of these services or a collaborating services employ an authentication system for security reasons. The authentication system performs access control and also performs maintenance and management of IDs and passwords. Generally, since a service user purchases only a license of the service which the user desires to use, the authentication system checks whether the user is licensed. Japanese Patent Application Laid-Open No. 2002-333928 discusses a service operation method that performs authentication of various services and management of licenses. According to this service, the access control is performed based on license information managed for each service. Further, availability of the use of service is controlled by the units of service.

A case where an existing cloud service A provides two new services in collaboration with other services will be explained. A new fee-based service B of the cloud service A collaborates with a service "b" and a new free service C of the cloud service A collaborates with a service "c", according to the conventional license management, in which the user needs to be licensed before using these services. In other words, a license dedicated to the use of the fee-based service B needs to be issued for the user that desires to use the fee-based service B. According to this access control, only the user having the license can use the service. Further, as is the case with the fee-based service B, a license dedicated to the use of the free service C needs to be issued and verified. According to this license, the service "c" can be confirmed as a reliable service.

However, if the usage charge of the server cannot be recovered from the users of the free service, while issuing a dedicated license to each of the users and managing the licenses, its cost will become a significant burden on the operation. Further, since license verification is necessary even when the user uses the free service, overall performance of the cloud service is reduced.

SUMMARY OF THE INVENTION

The present invention is directed to a unified license management structure which does not reduce an overall performance of a cloud service even if a plurality of services collaborate with the cloud service.

According to an aspect of the present invention, a server apparatus includes an acquisition unit configured to, when authorization information including token identification information of an authorization token and a scope as authority of the authorization token is received, reference the token data linked to the token identification information, the scope, and user identification information based on the token identification information, and acquire the scope and the user identification information linked to the token identification information included in the authorization information, a determination unit configured to, if identification information used for identifying a cloud service is set in the scope acquired by the acquisition unit, determine whether the cloud service identified by the identification information is defined in the scope included in the authorization information, a service use non-permission unit configured not to, if the determination unit determines that the cloud service identified by the identification information is not defined in the scope included in the authorization information, permit use of the cloud service identified by the identification information, a service availability determination information acquisition unit configured to, if the determination unit determines that the cloud service identified by the identification information is defined in the scope included in the authorization information, reference the role reference data to which the scope and information of whether the role as authority for a user to access the cloud service needs to be referenced are linked, based on the scope included in the authorization information, and acquire service availability determination information used for determining whether a role linked to the scope included in the authorization information needs to be referenced, and a service use permission unit configured to permit use of the cloud service identified by the identification information if the service availability determination information acquired by the service availability determination information acquisition unit indicates that referencing the role is not necessary.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 5 illustrates an example of data managed by a user management table.

FIG. 6 illustrates an example of data managed by a token table.

FIG. 7 illustrates an example of data managed by a role reference table.

FIG. 11 illustrates an example of a scope management table.

DESCRIPTION OF THE EMBODIMENTS

Various exemplary embodiments, features, and aspects of the invention will be described in detail below with reference to the drawings.

Figure 1:
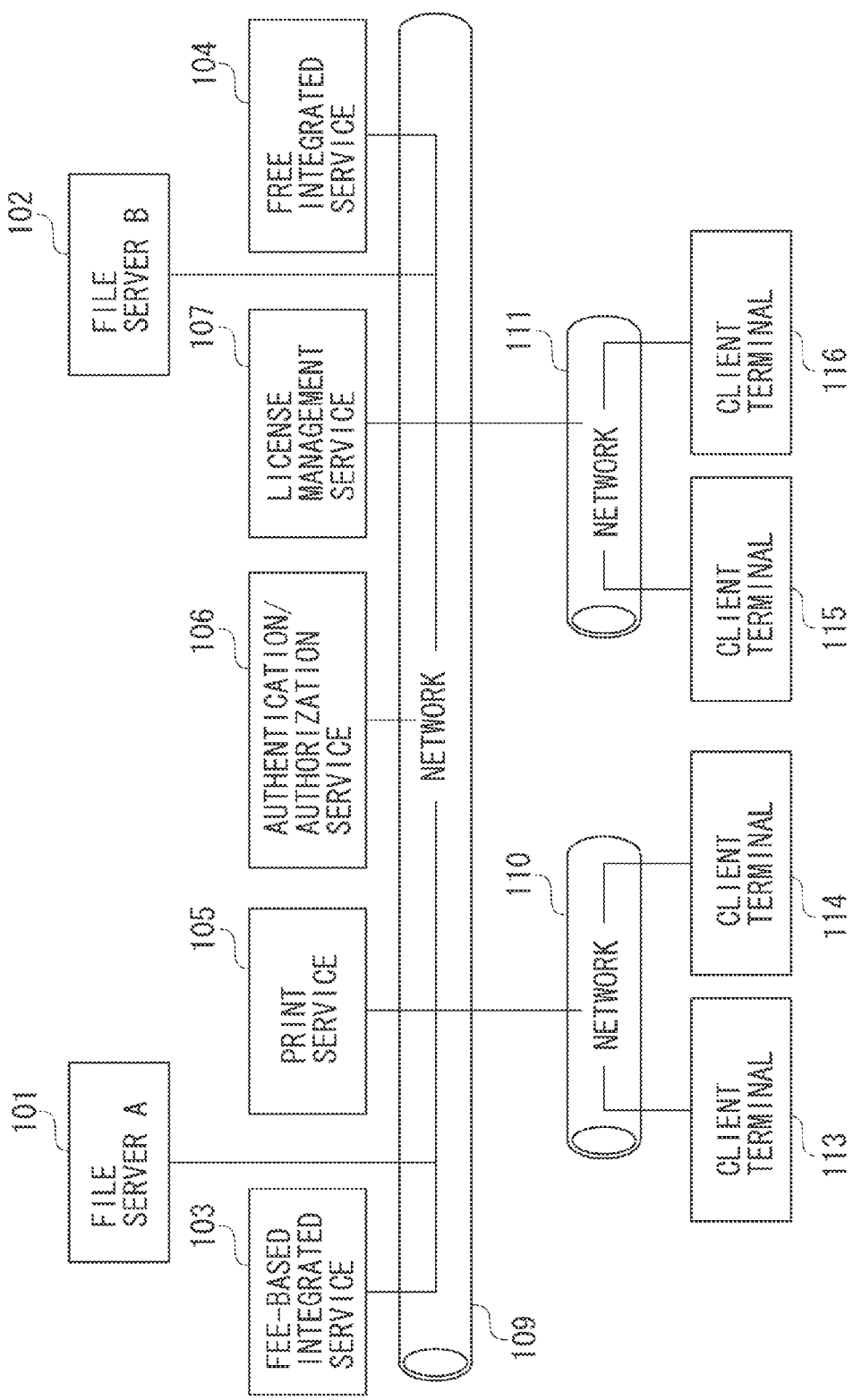
FIG. 1 illustrates an example of a system configuration of a cloud system.

FIG. 1 illustrates an example of a system configuration of a cloud system.

A file server A 101, a file server B 102, a fee-based integrated service 103, a free integrated service 104, a print service 105, an authentication/authorization service 106, a license management service 107, and client terminals 113 to 116 are connected to each other via networks 109 to 111. One or more of the client terminals 113 to 116 are connected to the networks.

The networks 109 to 111 can be any of a local area network (LAN), wide area network (WAN), telephone line, dedicated digital line, Asynchronous Transfer Mode (ATM) line, frame relay line, cable television line, wireless line for data broadcast of an intranet or the Internet. The networks 109 to 111 may also be a communication network which is a combination of such networks. The networks 109 to 111 can be any type of networks so long as they can transmit/receive data.

In the general cloud service, the network 109 is the Internet. Further, the networks 110 and 111 are networks such as an intranet and a service provider network.

The fee-based integrated service 103, the free integrated service 104, the print service 105, the authentication/authorization service 106, and the license management service 107 are generally executed on a server computer. According to the present embodiment, since a group of these services provides the cloud service to the user, each server is referred to as a service.

Each of the client terminals 113 to 116 is, for example, a desktop personal computer, a notebook personal computer, a mobile personal computer, or a personal digital assistant (PDA), but can also be a cellular phone with a built-in program execution environment. Each of the client terminals 113 to 116 includes a built-in program execution environment for a web browser (the Internet browser, WWW browser, or browser for using the World Wide Web). The file server A 101 and the file server B 102 are generally executed on a server computer and include a function to store, delete, or acquire electronic data as needed.

Figure 2:
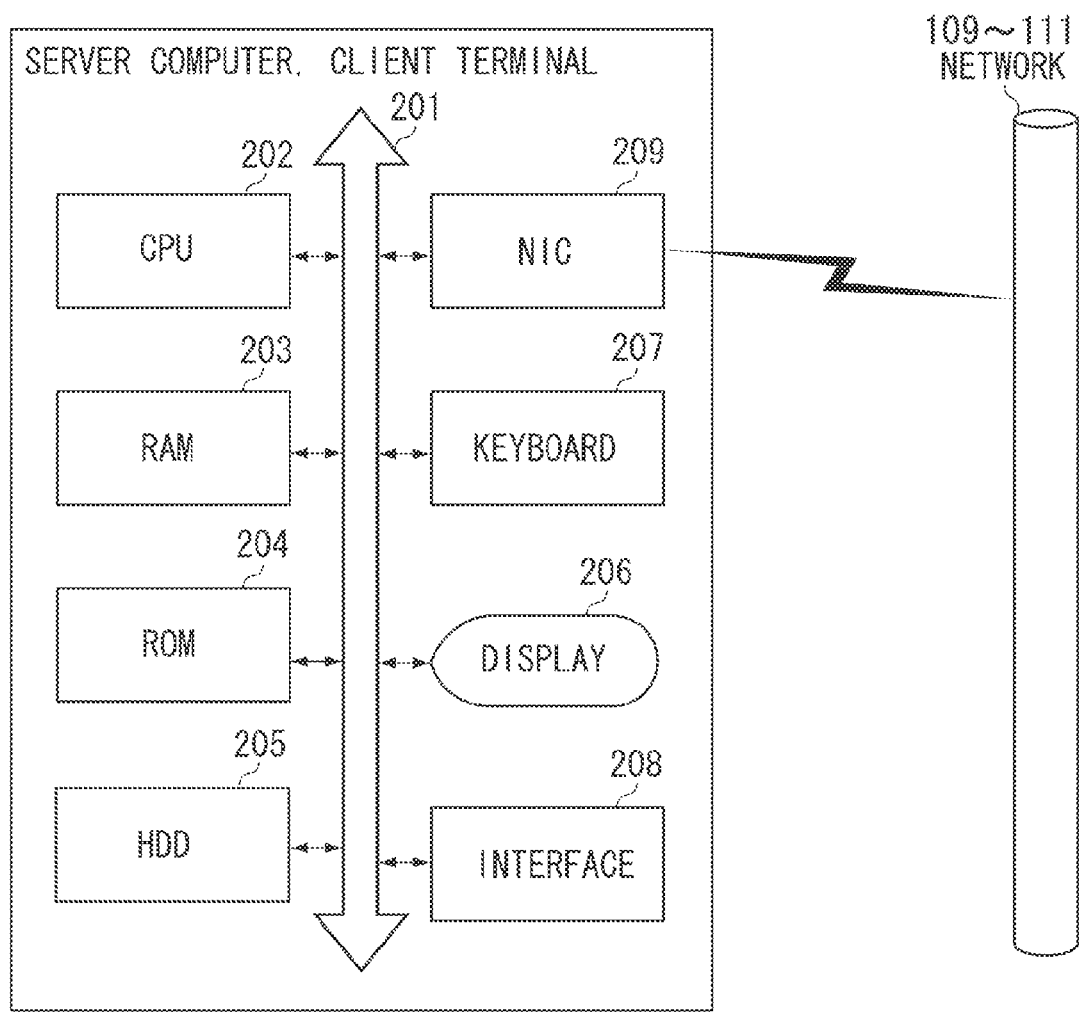
FIG. 2 illustrates an example of a hardware configuration of a computer that executes a group of services and a client terminal.

FIG. 2 illustrates an example of a hardware configuration of a computer that executes a group of services 103 to 107 and the client terminals 113 to 116.

A central processing unit (CPU) 202 controls the entire apparatus. The CPU 202 executes application programs and an operating system (OS) stored in a hard disk drive (HDD) 205. Further, according to the control of the CPU 202, information necessary in executing the programs and files are temporarily stored in a random access memory (RAM) 203.

A read-only memory (ROM) 204 is a storage unit and stores various types of data such as a basic I/O program. The RAM 203 is a temporary storage unit and functions as a main memory and a work area of the CPU 202. The HDD 205 is an external storage unit and functions as a large-capacity memory. Application programs such as a web browser, programs of the group of services, OS, and related programs are stored in the HDD 205.

A display 206 is a display unit and displays a command which has been input by the user via a keyboard 207. An interface 208 is an external apparatus I/F and is connected, for example, to a printer, a USB device, or a peripheral apparatus. The keyboard 207 is an instruction inputting unit. A system bus 201 transfers data between components in the apparatus. A network interface card (NIC) 209 is used for exchanging data with an external apparatus via the networks 109 to 111.

The configuration of the above-described computer is merely an example and the configuration of the computer according to the present invention is not limited to the example illustrated in FIG. 2. For example, the device where the data or the program is stored can be changed to the ROM 204, the RAM 203, or the HDD 205 depending on the content.

Functions of a server (or a service) are realized by the CPU of the server (service) executing processing based on the programs stored in the HDD of the server (service). The CPU of the client terminal executes similar processing.

Figure 3:
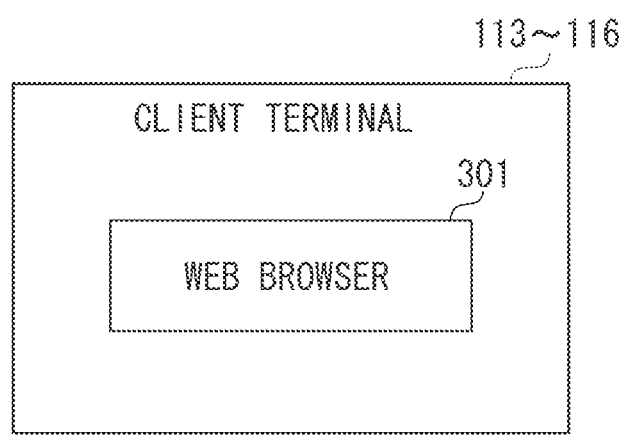
FIG. 3 illustrates an example of a functional configuration of the client terminal.

FIG. 3 illustrates an example of a functional configuration of the client terminals 113 to 116. Each of the client terminals 113 to 116 uses a web browser 301 and transmits a request to various web applications provided by the group of services 103 to 107 and displays a response to the request. The user of the cloud service uses the cloud service via the web browser 301 of the client terminals 113 to 116.

Next, the fee-based integrated service 103, the free integrated service 104, the print service 105, the authentication/authorization service 106, and the license management service 107, which provide the cloud service, will be described.

First, the authentication/authorization service 106 will be described with reference to FIGS. 4 to 9. The authentication/authorization service 106 is a service responsible for the authentication/authorization of the whole cloud service including the integrated service.

Figure 4:
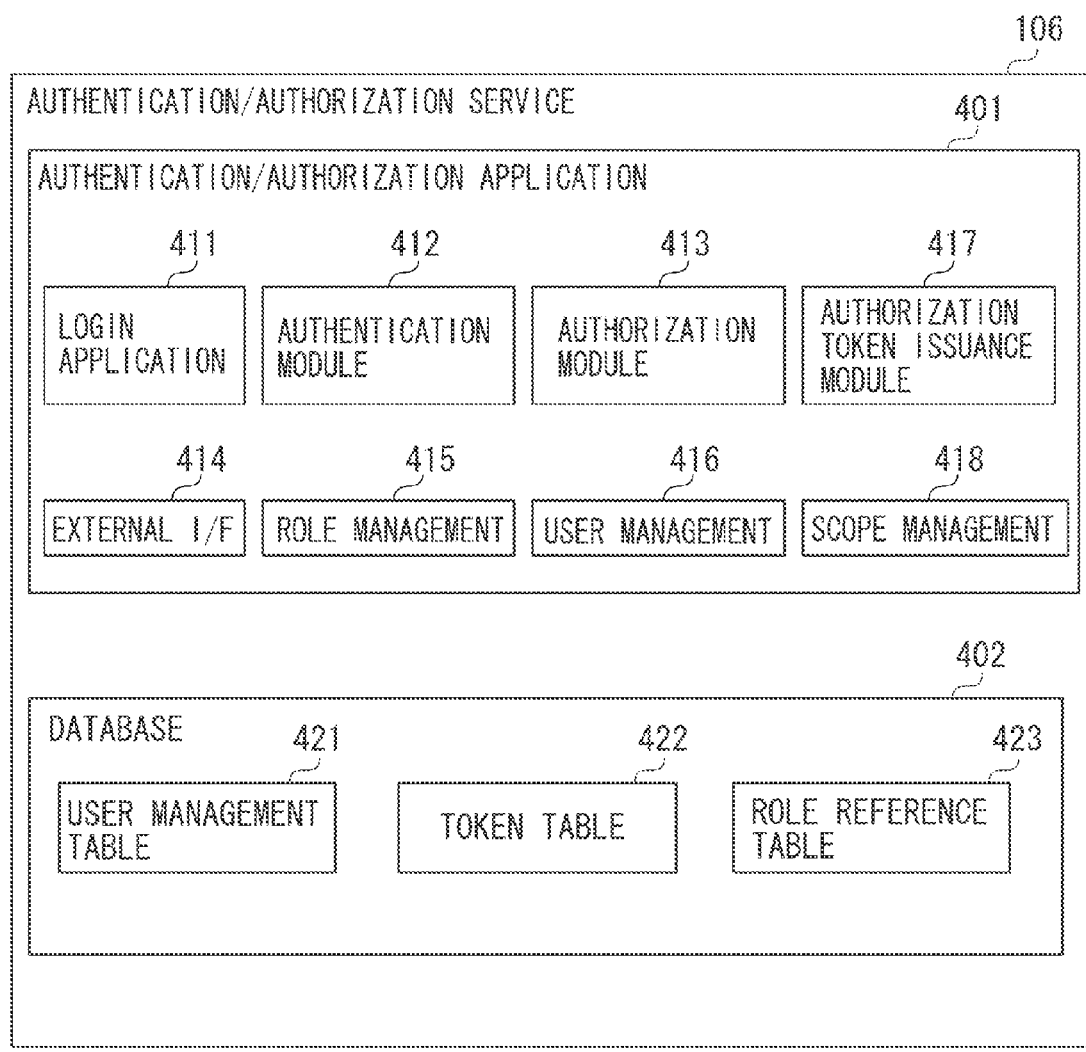
FIG. 4 illustrates an example of a functional configuration of an authentication/authorization service.

FIG. 4 illustrates an example of a functional configuration of the authentication/authorization service 106. An authentication/authorization application 401 provides an authentication function. A database 402, which manages user IDs, passwords, attribute information of the users, and authorization information, performs data management so that the authentication/authorization application 401 can realize the authentication function. A user management table 421 is a table that manages various types of information of the user. FIG. 5 illustrates an example of data managed by the user management table 421. A user ID 511 is information used for uniquely identifying a user by the system. The user ID is input at the time of login.

A password 512 is information of a password which is used when the user logs in the system. Generally, a character string of a password is not stored as it is and is hashed before it is stored for security reasons.

A tenant ID 513 is information used for uniquely identifying a tenant of the user. According to the present embodiment, a tenant is a unit by which a customer uses and manages a cloud service. According to the cloud service, a plurality of tenants is managed by one system. If a contract is signed up with a user corporation, a tenant is linked to that corporation and the corporation is managed by each tenant. The data of each customer of the corporation is also managed by the tenant of the customer. In other words, if a user is managed by a unit of the corporation which the user belongs to, the user is referred to as managed by the tenant. According to this concept of the tenant, the user corporation can use the cloud service as if it is using a service specially provided for the user corporation on a different system.

A surname 514 and a first name 515 are information arbitrarily input by the user. The authentication/authorization service 106 can manage a name of a user by the surname 514 and the first name 515. An assigned role 516 is a list of role IDs assigned to the users (to a particular user). A role is a concept used for managing authority which is required when the user accesses the cloud service. The user management table is an example of user management data.

A token table 422 is used for managing information of the scope of each authorization token and the user having the authorization token. The authorization token, which is also called an access token, is a data structure including user identification information and authority information. The authorization token is given from the system to a user who has logged into the system. Before a user accesses a file or a service, it is checked whether the authorization token of the user indicates that the user has the access authority regarding the file or the service. The access is allowed (or not allowed) depending on the result of this checking.

FIG. 6 illustrates an example of data managed by the token table 422. The authorization token is one record managed by the token table. Further, a scope is authority which the authorization token holds. An act of a user can be limited depending on the setting of the scope. For example, a record 610 is an authorization token of a token ID "as234sfd5". The user ID is "user1" and the scope is limited to "free integrated service". The token ID is an example of token identification information. The token table is an example of token data.

A role reference table 423 is used for managing information of whether each scope 602, designated by the token table 422, needs to reference (refer to) the role. FIG. 7 illustrates an example of data managed by the role reference table 423. A record 711 indicates that if a scope of the authorization token is a fee-based integrated service, it is necessary to determine whether the user linked to the authorization token has the role, in other words, whether the user is given the authority to use the fee-based integrated service by referencing (referring to) the user management table 421. The role reference table is an example of role reference data. Role reference is an example of service availability determination information.

A user management module 416 manages users that can use the cloud service. Information of each user includes setting information of user ID, password, user name, tenant ID (information of the tenant to which the user belongs), and a role assigned to the user.

A role management module 415 manages roles. A role embodies the authority which is required when a user accesses a cloud service. For example, the role management 415 defines roles such as "print user" and "fee-based integrated service".

A scope management module 418 manages the role reference table 423. If a service is newly added to the cloud service, the scope management 418 adds the service to the role reference table 423.

A login application 411 is a web application that provides a function which the user uses when the user logs in to the cloud service. When the login application 411 receives a request from the web browser 301 of the client terminals 113 to 116, the login application 411 executes the login processing based on the authentication information such as the user ID and the password which the user inputs via the web browser.

When the login processing is performed, the login application 411 notifies an authentication module 412 of the authentication information of the user. The authentication module 412 checks the user ID and the password registered in the database based on the notified user authentication information, and performs the authentication processing. Then, the authentication module 412 returns the result to the login application 411. The login application 411 generates a web screen based on the authentication result, and transmits it to the web browser 301.

An external I/F 414 is used for processing a processing request transmitted from an authentication agent 901 described below. The function of the authentication/authorization service 106 is invoked from an external apparatus via the external I/F 414. An authorization token issuance module 417 issues an authorization token to the login user whose authentication has been successful, and adds the user to the token table 422. A token ID 601 consists of a character string. A user ID of the login user is assigned to a user ID 603.

Figure 8:
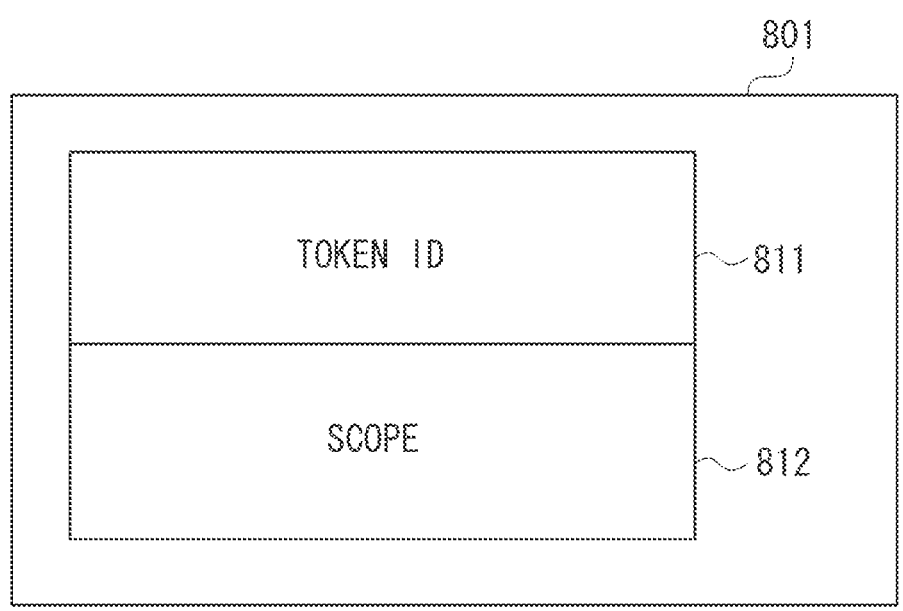
FIG. 8 illustrates an example of authorization information.
Figure 9:
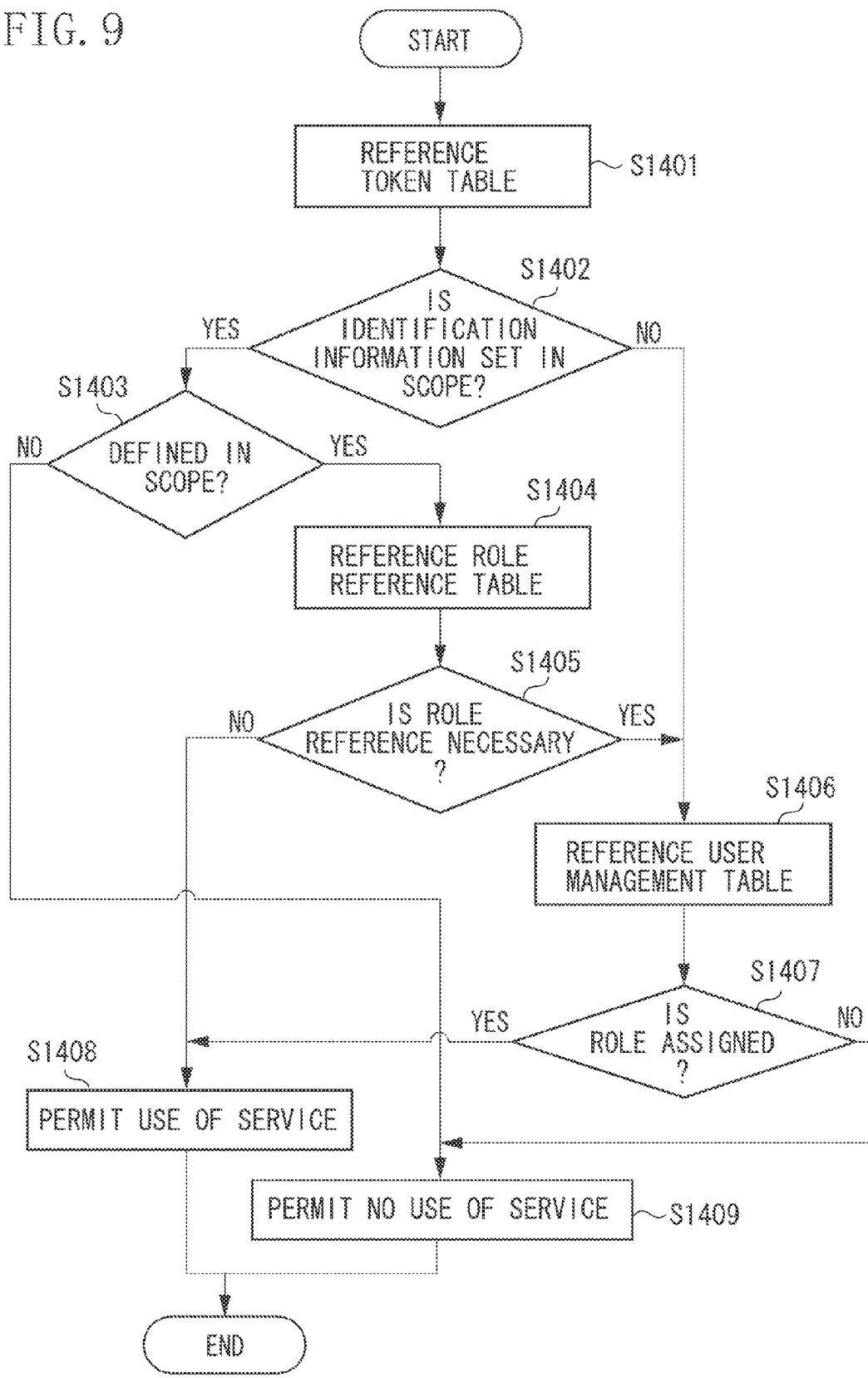
FIG. 9 illustrates an example of information processing of authorization token verification.

An authorization module 413 realizes an authorization function regarding, for example, whether the user which requests the use of the cloud service can access a particular service. FIG. 8 illustrates an example of authorization information. The authorization module 413 receives authorization information 801, which includes a token ID 811 and a received scope 812, and determines whether the user linked to the token ID 811 can use the service designated in the received scope 812. FIG. 9 illustrates an example of the verification processing of the authorization token. According to the present embodiment, a print service generates the authorization information 801 (see e.g. paragraph 71 below).

In step S1401, the authorization module 413 references the token table, determines the token ID 811 that corresponds to the token ID included in the received authorization information, and acquires the scope 812 and the user ID linked to the token ID 811.

In step S1402, the authorization module 413 determines whether identification information, other than null, used for identifying a cloud service is set in the scope acquired from the token table in step S1401.

If the authorization module 413 determines that identification information used for identifying a cloud service is set in the scope (YES in step S1402), the processing proceeds to step S1403. In step S1403, the authorization module 413 determines whether the cloud service (ex. CHARGE-FREE INTEGRATED SERVICE, PRINT SERVICE in FIG. 6) identified by the identification information includes the cloud service defined in the scope 812.

If the authorization module 413 determines that the cloud service is not defined in the scope 812 (NO in step S1403), the processing proceeds to step S1409. In step S1409, the authorization module 413 determines that the authorization information does not permit use of service.

On the other hand, if the authorization module 413 determines that the cloud service is defined in the scope 812 (YES in step S1403), the processing proceeds to step S1404. In step S1404, the authorization module 413 references the role reference table.

In step S1405, the authorization module 413 determines whether the scope acquired in step S1401 requires role reference. To be more precise, based on the scope acquired in step S1401, the authorization module 413 references the role reference table 423 and acquires information of the role reference indicating whether the role linked to the scope needs to be referenced (acquisition of service availability information).

If the role needs to be referenced (YES in step S1405), the processing proceeds to step S1406. Further, in step S1402, if the authorization module 413 determines that identification information used for identifying a cloud service is not set in the scope (NO in step S1402), the processing proceeds to step S1406. In step S1406, the authorization module 413 references the user management table 421.

In step S1407, the authorization module 413 determines whether a role corresponding to the scope 812 is assigned to the user having the user ID acquired in step S1401. To be more precise, based on the user ID, the authorization module 413 references the user management table 421 and acquires the "assigned role" (role acquisition) linked to the user ID. Then, the authorization module 413 determines whether the acquired "assigned role" includes the cloud service defined in the scope 812 (i.e., whether a role corresponding to the scope 812 is assigned to the user).

If such a role is not assigned to the user in step S1407 (NO in step S1407), the processing proceeds to step S1409. In step S1409, the authorization module 413 determines that the received authorization information does not permit use of the service. If the role does not need to be referenced in step S1405 (NO in step S1405) or if a role is assigned in step S1407 (YES in step S1407), the processing proceeds to step S1408. In step S1408, the authorization module 413 permits the use of the service.

As described above, by executing the steps of the flowchart in FIG. 9, even if a user desires to use a free integrated service, according to the processing in steps S1403 and S1405, the free integrated service included in the authorization information can be determined as a reliable service. Further, since it is not necessary to assign a special license to each user, operation cost is not increased.

Figure 10:
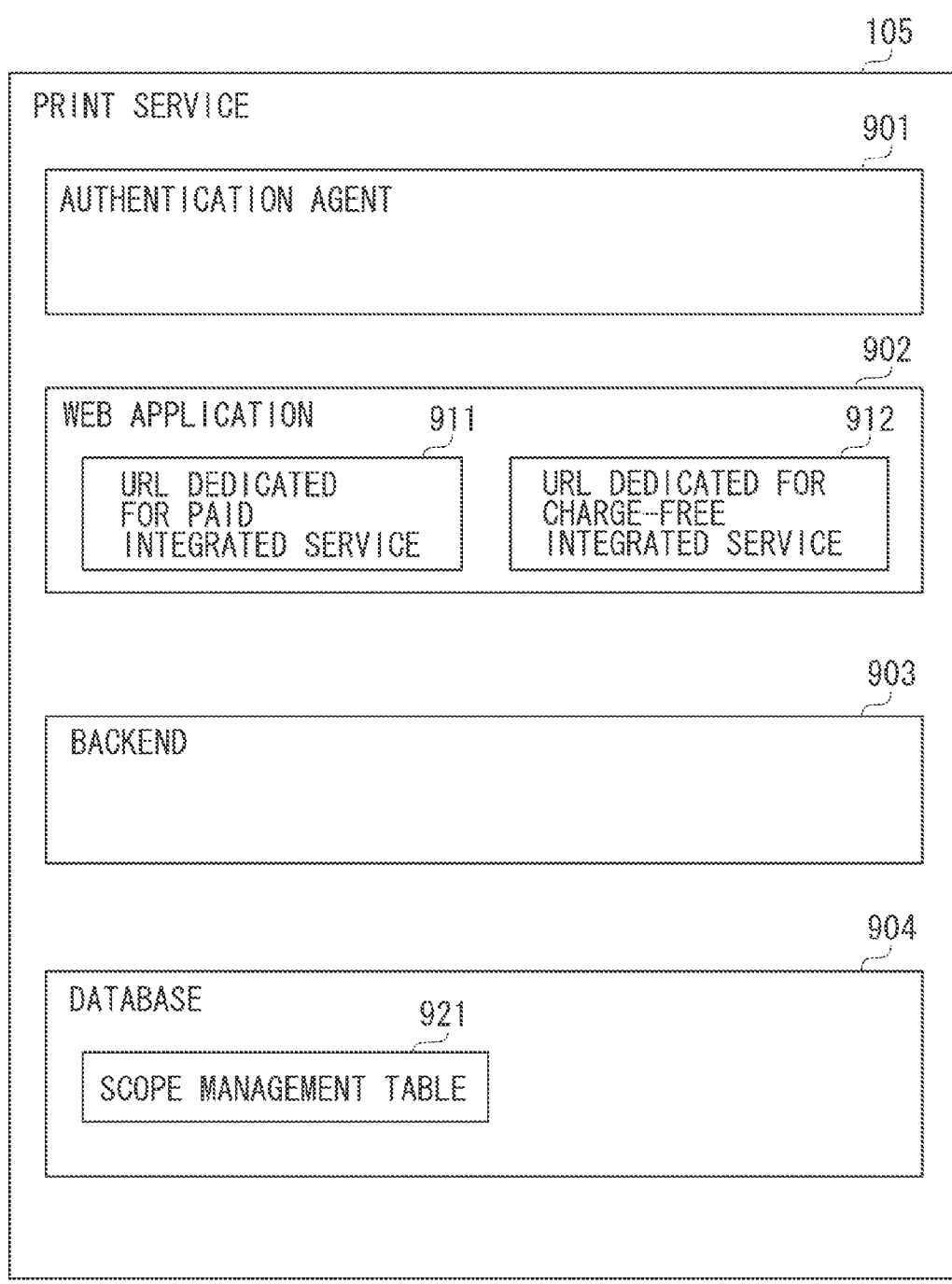
FIG. 10 illustrates an example of a functional configuration of a print service.

Next, the print service 105 will be described with reference to FIGS. 10 and 11. FIG. 10 illustrates an example of a functional configuration of the print service 105. The print service 105 provides a print function to a customer. The customer uses the print service 105 when the customer desires to perform printing using the function provided by the fee-based integrated service 103 or by using the function provided by the free integrated service 104.

A web application 902 receives a request from the fee-based integrated service 103 or the free integrated service 104. The web application 902 includes a Uniform Resource Locator (URL) 911 dedicated to fee-based integrated service and a URL 912 dedicated to free integrated service. The URL 911 dedicated to fee-based integrated service accepts a request from the fee-based integrated service 103. The URL 912 dedicated to free integrated service accepts a request from the free integrated service 104. If an integrated service is added, a dedicated URL that corresponds to the service will be added to the web application 902.

The web application 902 which has received a request from a corresponding service via the URL 911 dedicated to fee-based integrated service or the URL 912 dedicated to free integrated service requests a backend 903 to perform processing according to the content of the request. The backend 903 provides a function for realizing the service, for example, a function for print execution. The backend 903 executes the processing requested by the web application 902 and returns the result to the web application 902. Based on the processing result acquired from the backend 903, the web application 902 returns the result of the request to the fee-based integrated service 103 or the free integrated service 104.

A database 904 stores information necessary for using the various functions of the print service 105. FIG. 11 illustrates an example of a scope management table 921. The scope management table 921 is used for managing a URL that accepts a request made to the web application 902 and a scope corresponding to the URL. For example, a record 1211 indicates that a scope corresponding to "http://fee-based_service/*" is a paid print service. If a URL that accepts a request is added, the corresponding scope is set and the scope management table 921 is updated.

When the print service 105 accepts a request made to the web application 902 from the fee-based integrated service 103 or the free integrated service 104, the access of the user to the print service 105 is authorized by collaborating with the authentication/authorization service 106. An authorization token is required in the case of the access from the fee-based integrated service 103 or the free integrated service 104.

The print service 105 transmits a scope and an authorization token to the external I/F 414 of the authentication/authorization service 106. This scope is obtained by using the URL of the web application 902 that accepted the request from the service and by referencing the scope management table 921. The authentication/authorization service 106 performs the verification processing of the authorization token by using the function of the authorization module 413 and returns the result to the print service 105. If the authentication/authorization processing is successful, the print service 105 continues the processing. If the authentication/authorization processing fails, an error screen is displayed.

According to the above-described processing, the use of the print service 105 is controlled.

The authentication/authorization processing can also be performed by the authentication agent 901. For example, the authentication agent 901 interrupts the request from the fee-based integrated service 103 or the free integrated service 104 to the web application 902 and collaborates with the authentication/authorization service 106. In this manner, the authentication agent 901 can authenticate access of the user to the print service 105.

An authorization token is necessary in the access of (from) the fee-based integrated service 103 or the free integrated service 104. The authentication agent 901 transmits a scope and an authorization token to the external I/F 414 of the authentication/authorization service 106 and verifies the authorization token. The scope is obtained by using the URL of the web application 902 that accepted the request from the service and by referencing the scope management table 921. The authentication/authorization service 106 performs the authentication/authorization processing by using the function of the authorization module 413 and returns the result to the authentication agent 901. If the authentication/authorization processing is successful, the authentication agent transmits the request to the web application 902. If the authentication/authorization processing fails, an error screen is displayed.

According to the above-described processing, the use of the print service 105 is controlled.

Figure 12:
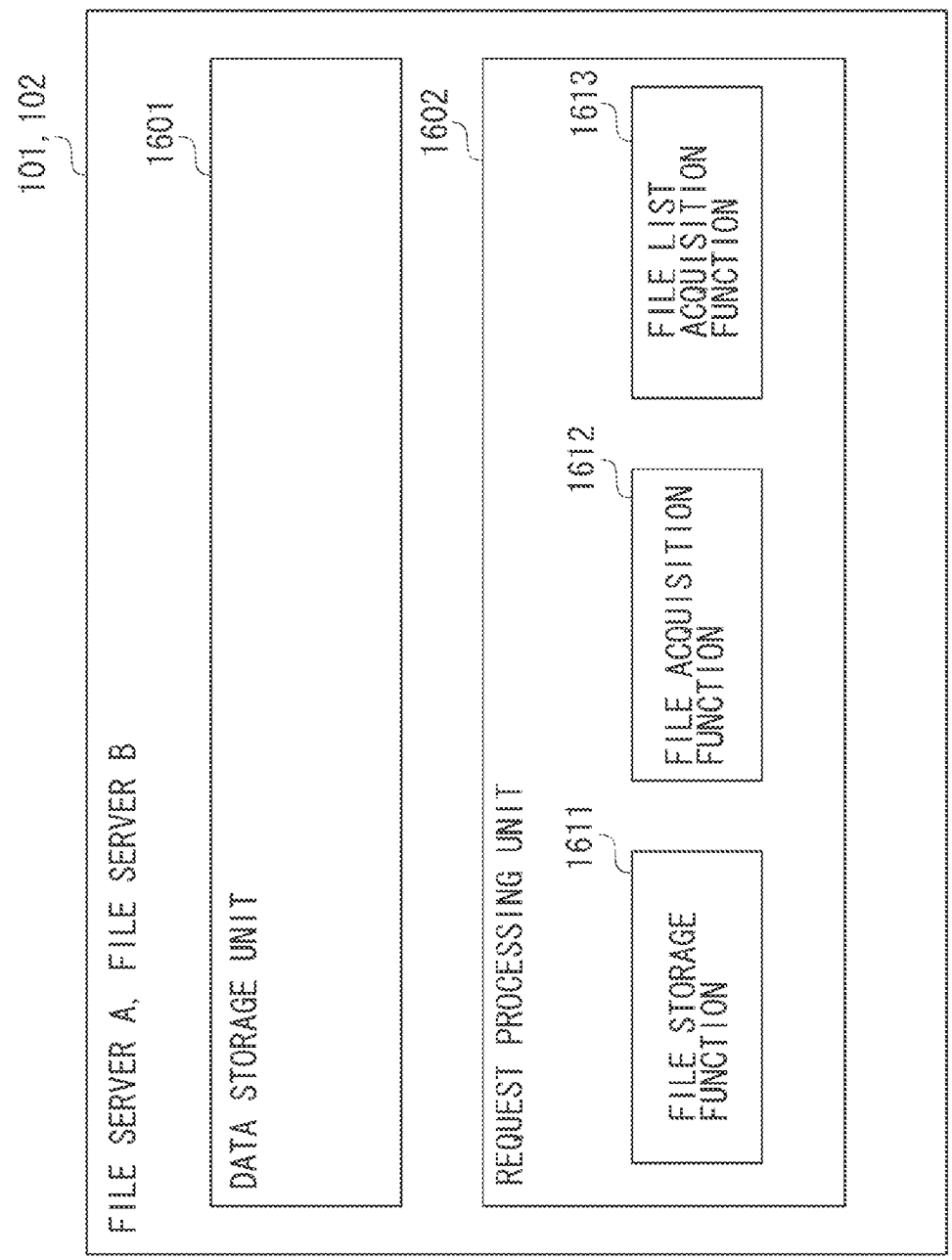
FIG. 12 illustrates an example of a functional configuration of a file server A and a file server B.

FIG. 12 illustrates an example of a functional configuration of the file server A 101 and the file server B 102.

A data storage unit 1601, which stores files, is an external storage unit such as a HDD. A request processing unit 1602 processes a request made from an external apparatus to the file server A 101 or the file server B 102. The request processing unit 1602 has three functions: file storage 1611, file acquisition 1612, and file list acquisition 1613.

If the request processing unit 1602 receives a file storage request, the file storage 1611 stores the requested file in the data storage unit 1601. If the request processing unit 1602 receives a file acquisition request, the file acquisition 1612 determines whether the file which has been requested is stored in the data storage unit 1601. If the file is stored, the file acquisition 1612 returns the file that corresponds to the request. If the request processing unit 1602 receives a request for acquisition of a file list, the file list acquisition 1613 returns a list of file names of the files stored in the data storage unit and URLs corresponding to the files.

Figure 13:
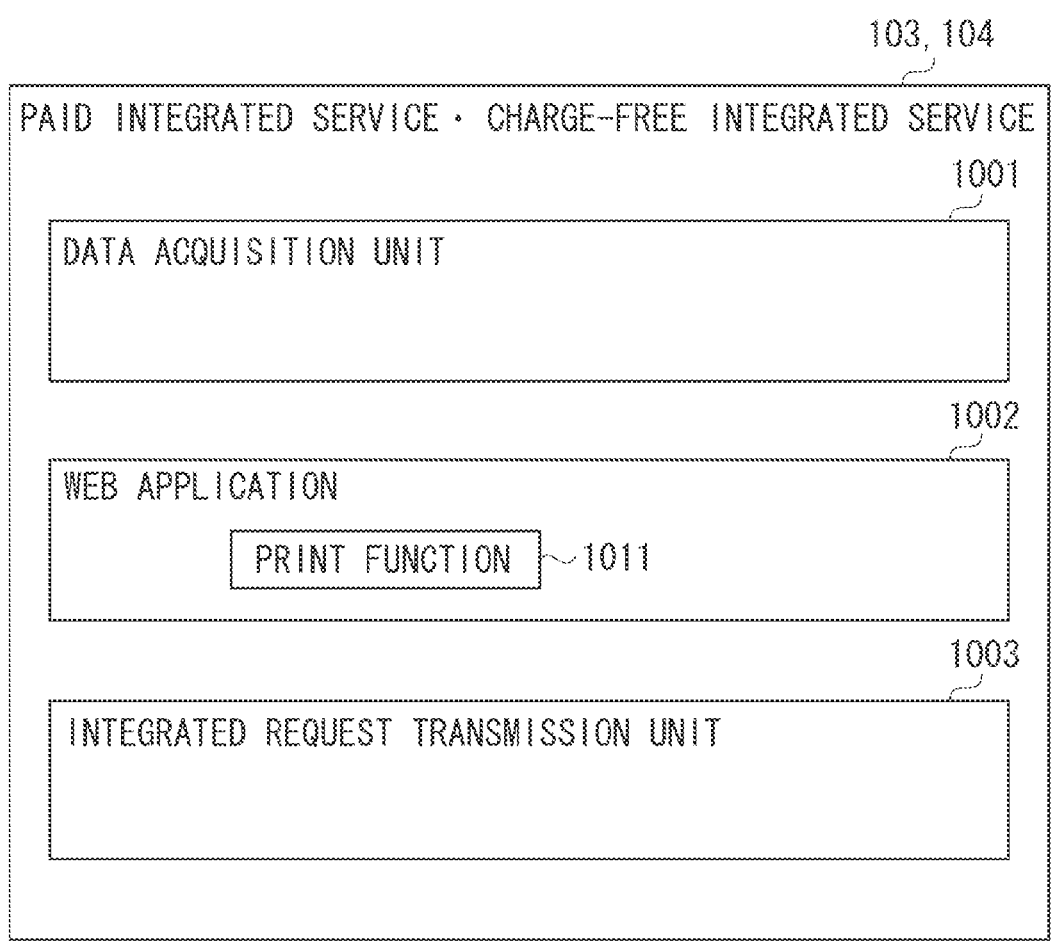
FIG. 13 illustrates an example of a functional configuration of a fee-based integrated service and a free integrated service.

FIG. 13 illustrates an example of a functional configuration of the fee-based integrated service 103 and the free integrated service 104.

The fee-based integrated service 103 is a fee-based service for acquiring a file from the file server A 101 and printing the file using the print service 105. Further, the free integrated service 104 is a free service for acquiring a file from the file server B 102 and printing the file using the print service 105.

A data acquisition unit 1001 of the fee-based integrated service 103 issues a data acquisition request to the request processing unit 1602 of the file server A 101 and acquires a file from the file server A 101. A data acquisition unit 1001 of the free integrated service 104 issues a data acquisition request to the request processing unit 1602 of the file server B 102 and acquires a file from the file server B 102.

An integrated request transmission unit 1003 transmits a file print request to the print service 105. The integrated request transmission unit 1003 of the fee-based integrated service 103 transmits a print request to the URL 911 dedicated to fee-based integrated service. The integrated request transmission unit 1003 of the free integrated service 104 transmits a print request to the URL 912 dedicated to free integrated service. A web application 1002 and a print function 1011 will be described below.

Figure 14:
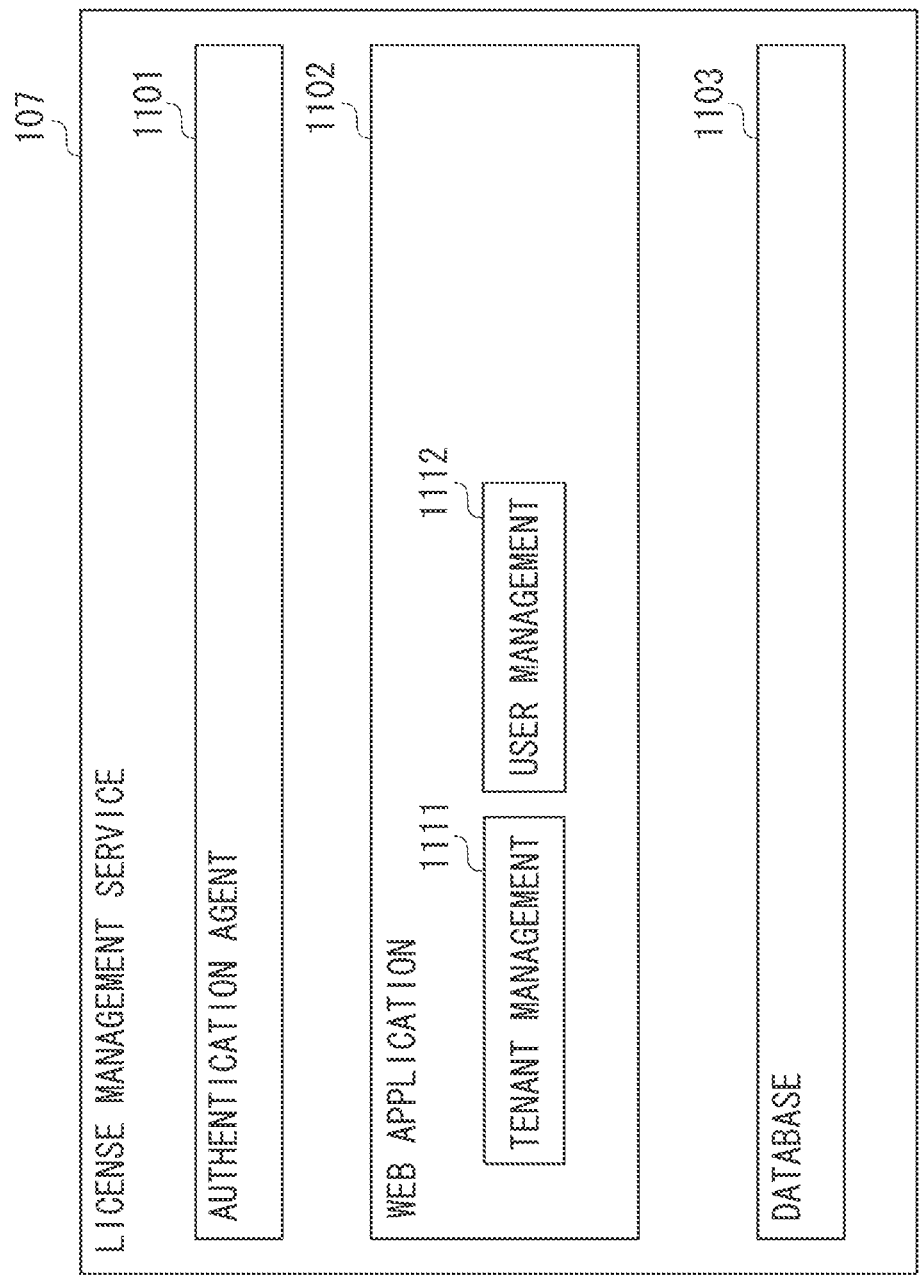
FIG. 14 illustrates an example of a functional configuration of a license management service.

FIG. 14 illustrates an example of a functional configuration of the license management service 107.

The license management service 107 provides a business infrastructure such as license management and user management of the fee-based service.

A web application 1102 receives a request from the web browser 301 of the client terminals 113 to 116. On receiving the request, the web application 1102 performs processing according to the content of the request, generates a web screen as a processing result, and transmits a response to the web browser 301.

The web application 1102 provides functions of tenant management 1111 and user management 1112. The tenant management 1111 and the user management 1112 will be described below. A database 1103 manages data used by the web application 1102. An authentication agent 1101 collaborates with the authentication/authorization service 106 as is the case of the authentication agent 901, and performs access control of the web application 1102 of the license management service 107.

Figure 15:
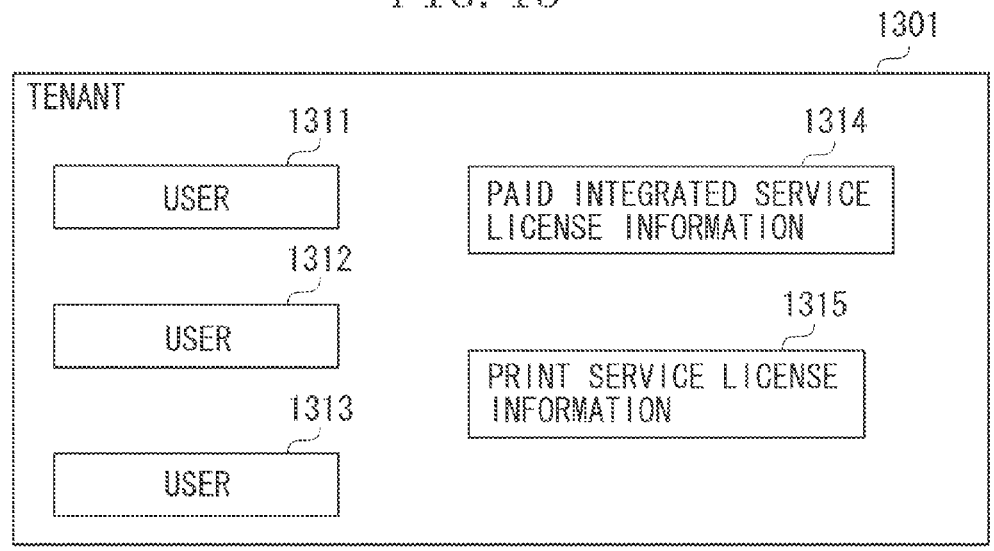
FIG. 15 is a schematic diagram illustrating a tenant structure.

FIG. 15 is a schematic diagram illustrating a tenant structure.

A cloud service manages the use of its service by the unit of a tenant 1301. Thus, the tenant 1301 exists for each customer. In FIG. 15, users 1311 to 1313 belong to the tenant 1301. Each user is uniquely identified in the tenant 1301. The tenant 1301 can store a plurality of pieces of license information. One service is linked to one piece of license information.

According to the present embodiment, license information of the fee-based integrated service 103 is managed by fee-based integrated service license information 1314 and license information of the print service 105 is managed by print service license information 1315. The license information includes, for example, information of the maximum number of users who can use the service, license type, and expiry date. Further, license information for the free integrated service 104 is not managed in the tenant.

Next, the use of the fee-based integrated service 103 will be described.

A vendor user logs in the cloud service and generates the tenant 1301 for the customer and a user account for a customer administrator by using the tenant management 1111 of the license management service 107. After the tenant 1301 is generated, a license is set for the tenant 1301.

The customer administrator logs in the cloud service and generates "general user" in the tenant to which the customer administrator belongs using the user management 1112 of the license management service 107. When the customer administrator generates the "general user", the user management 1112 accesses the user management 416 of the authentication/authorization service 106 via the external I/F 414 of the authentication/authorization service 106. The user management 416 adds the general user to the user management table 421.

When a role of the fee-based integrated service 103 is assigned to the generated user by the customer administrator by using the user management 1112, the general user can use the fee-based integrated service 103. When the customer administrator assigns the role, the user management 1112 accesses the user management 416 of the authentication/authorization service 106 via the external I/F 414 of the authentication/authorization service 106 as it does when a "general user" is generated. Then, the user management 416 sets the role of the fee-based integrated service 103 to the assigned role 516 in the user management table 421.

Next, procedures for the general user printing a file in the file server A 101 from the fee-based integrated service 103 via the print service 105 will be described.

After the general user logs in the cloud system using the web browser 301, if the general user accesses the web application 1002 of the fee-based integrated service 103, the access is redirected to the authorization token issuance module 417 and an authorization token is issued. When the token is issued, the issued token is added to the token table 422. The scope 602 is set to null and the user ID 603 is set to the user ID of the general user. The authorization token which has been issued is notified to the fee-based integrated service 103.

The general user executes the printing using the print function 1011 from the web browser 301. The print function 1011 transmits a file list acquisition request to the request processing unit 1602 of the file server A 101. The request processing unit 1602 transfers the request to the file list acquisition 1613 and acquires a file list stored in the data storage unit 1601. Then, the request processing unit 1602 transmits the file list to the print function 1011. The web application 1002 generates a web screen of the list of files stored in the file server A 101, and transmits a response to the web browser 301.

When the general user selects a file to be printed from the file list displayed by the web browser 301, a file print request is transmitted from the web browser 301 to the web application 1002. Then, the print function 1011 transmits print data 1501 to the URL 911 dedicated to fee-based integrated service of the print service 105 and the web application 902 receives the print data 1501 via the URL 911 dedicated to fee-based integrated service.

The print data 1501 includes a file URL 1511 of a file to be printed and stored in the file server A 101 and an authorization token 1512. The web application 1002 generates a web screen indicating to the general user that the job has been accepted, and returns it to the web browser 301.

Figure 16:
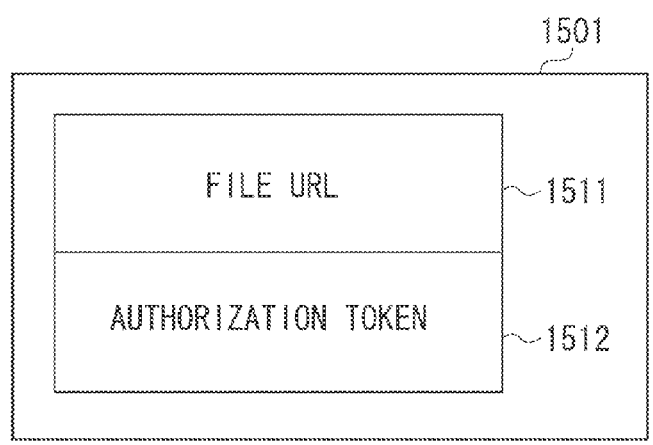
FIG. 16 illustrates an example of print data.

FIG. 16 illustrates an example of the print data. As described above, since the fee-based integrated service has the authorization token generated by the authentication/authorization service, the print data including the authorization token in FIG. 16 can be generated.

The web application 902 transmits the received print data 1501 to the backend 903. The backend 903 generates the authorization information 801 from the print data 1501 which has been received and the URL 911 dedicated to fee-based integrated service, and transmits the generated authorization information 801 to the authentication agent 901.

Together with the authorization information 801, the authentication agent 901 transmits a request to permit the general user linked to the authorization token 1512 to use a fee-based integrated service, to the authorization module 413. According to the flowchart in FIG. 9, in step S1402, the authorization module 413 determines that identification information used for identifying a cloud service is not set in the scope (NO in step S1402). In step S1407, the authorization module 413 determines that a role is assigned (YES in step S1407). In step S1408, the authorization module 413 permits the use of the service. Then, the authorization module 413 returns the determination result to the authentication agent 901. The authentication agent 901 further transmits the determination result to the backend 903. If the use of the service is not permitted as a result of the determination, an error screen is displayed.

Next, the backend 903 transmits a file acquisition request of the file URL 1511 to the request processing unit 1602 of the file server A 101. The request processing unit 1602 transmits the request to the file acquisition 1612, and the file acquisition 1612 acquires the file from the data storage unit 1601. The request processing unit 1602 transmits the acquired file to the backend 903, and the backend 903 transmits the file to the output apparatus.

The above-described procedures are executed when a general user (paid user) uses a paid integrated print service.

Next, the use of the free integrated service 104 will be described.

The general user prints a file in the file server B 102 from the free integrated service 104 via the print service 105. After the general user logs in the cloud system using the web browser 301 of the client terminals 113 to 116, if the general user accesses the free integrated service 104, the access is redirected to the authorization token issuance module 417 and an authorization token is issued. When the token is issued, the issued token is added to the token table 422 and "free integrated service" is set to the scope 602. Further, the user ID of the general user is set to the user ID 603. The authorization token which has been issued is notified to the free integrated service 104.

The general user executes the printing using the print function 1011 from the web browser 301. The print function 1011 transmits a file list acquisition request to the request processing unit 1602 of the file server B 102. The request processing unit 1602 transfers the request to the file list acquisition 1613 and acquires a file list in the data storage unit 1601. Then, the request processing unit 1602 transmits the file list to the print function 1011. The web application 1002 generates a web screen of the list of files stored in the file server B 102, and transmits a response to the web browser 301.

When the general user selects a file to be printed from the file list displayed by the web browser 301, a file print request is transmitted from the web browser 301 to the web application 1002. Then, the print function 1011 transmits the print data 1501 to the URL 912 dedicated to free integrated service of the print service 105 and the web application 902 receives the print data 1501 via the URL 912 dedicated to free integrated service.

The print data 1501 includes the file URL 1511 of the file to be printed and stored in the file server B 102 and the authorization token 1512. As described above, since the free integrated service has the authorization token generated by the authentication/authorization service, the print data including the authorization token can be generated. The web application 1002 generates a web screen that indicates to the general user that the job has been accepted, and returns it to the web browser 301.

The web application 902 transmits the received print data 1501 to the backend 903. The backend 903 generates the authorization information 801 from the print data 1501 which has been received and the URL 912 dedicated to free integrated service, and transmits the generated authorization information 801 to the authentication agent 901.

Together with the authorization information 801, the authentication agent 901 transmits a request to permit the general user linked to the authorization token 1512 to use a free integrated service, to the authorization module 413. According to the flowchart in FIG. 9, in step S1402, the authorization module 413 determines that identification information used for identifying a cloud service is set in the scope (YES in step S1402).

In step S1403, the authorization module 413 determines that the scope 812 is defined as the scope of the authorization token 1512 (YES in step S1403). In step S1405, the authorization module 413 determines that the role reference is not necessary (NO in step S1405). In step S1408, the authorization module 413 permits the use of the service. Then, the authorization module 413 returns the determination result to the authentication agent 901. The authentication agent 901 further transmits the determination result to the backend 903. If the use of the service is not permitted as a result of the determination, an error screen is displayed.

Next, the backend 903 transmits a file acquisition request of the file URL 1511 to the request processing unit 1602 of the file server B 102. The request processing unit 1602 transmits the request to the file acquisition 1612, and the file acquisition 1612 acquires the file from the data storage unit 1601. The request processing unit 1602 transmits the acquired file to the backend 903, and the backend 903 transmits the file to the output apparatus.

The above-described procedures are executed when a general user (free user) uses a free integrated service.

Other Employments

The present invention is also realized when software (program) that realizes a function of the above-described exemplary embodiment is supplied to a system or an apparatus via a network or various storage media, and a computer (or CPU or micro processing unit (MPU)) of the system or the apparatus reads out the program and executes it.

According to each of the above-described exemplary embodiments, since a role of a free service is not assigned to the user, access of a paid (paying) user and a free (non-paying) user can be controlled under a unified structure without reducing the overall performance of the cloud service.

Thus, even if a plurality of services collaborate with the cloud service, a unified license management structure that does not reduce the overall performance of the cloud service can be realized.

According to the present invention, even if a plurality of services collaborate with the cloud service, a unified license management structure that does not reduce the overall performance of the cloud service can be realized.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

What is claimed is:

1. A system including:
a fee-based integrated service that a user belonging to a tenant for which a license is set is able to use, a free integrated service, an authentication/authorization service, a print service, and a client, wherein the fee-based integrated service, the free integrated service, the authentication/authorization service and the print service provide a cloud service,
wherein at least one of a plurality of central processing units (CPUs) included in the system functions as:
a setting unit configured to, when the user accessing the cloud service uses the fee-based integrated service, assign a role, which is a concept used for managing authority which is required when the user accesses the cloud service, to user information of the user and not to set a scope, which limits an act of the user, for first authorization information issued based on the user information, and configured not to, when the user uses the free integrated service, assign a role to the user information of the user and to set a scope for second authorization information issued based on the user information; and
an authorization unit configured to, in a case where a first print request is transmitted from a web browser of the client to the print service via the fee-based integrated service, authorize use of the fee-based integrated service in a manner such that the print service transmits authorization information related to the first print request to the authentication/authorization service, the authentication/authorization service determines whether the role is assigned to the user information without verifying a definition of the scope linked to the first authorization information, and the authorization unit, based on a determination by the authentication/authorization service that the role is assigned to the user information linked to the first authorization information, authorizes the use of the fee-based service, and
in a case where a second print request is transmitted from the web browser of the client to the print service via the free integrated service, authorize use of the free integrated service in a manner such that the print service transmits authorization information related to the second print request to the authentication/authorization service, the authentication/authorization service determines whether the scope linked to the second authorization information is included in a scope for using the free integrated service, and the authorization unit, based on a determination by the authentication/authorization service that the scope linked to the second authorization information is included in the scope for using the free integrated service, authorizes the use of the free integrated service without the authentication/authorization service verifying whether a role is assigned to the user information linked to the second authorization information.

2. A method for authorizing a user in a system having a fee-based integrated service that the user belonging to a tenant for which a license is set is able to use, a free integrated service, an authentication/authorization service and a print service, which provide a cloud service, the method comprising:
assigning a role, which is a concept used for managing authority which is required when the user accesses the cloud service, to user information of the user without setting a scope, which limits an act of the user, for first authorization information issued based on the user information, when the user accessing the cloud service uses the fee-based integrated service;
setting a scope for second authorization information issued based on the user information without assigning a role to the user information of the user, when the user uses the free integrated service;
authorizing use of the fee-based integrated service in a case where a first print request is transmitted from a web browser of a client to the print service via the fee-based integrated service, wherein the print service transmits authorization information related to the first print request to the authentication/authorization service, and wherein the authorizing the use of the fee-based integrated service includes:
determining, by the authentication/authorization service, whether the role is assigned to the user information without verifying a definition of the scope linked to the first authorization information; and
based on a determination that the role is assigned to the user information linked to the first authorization information, authorizing the use of the fee-based service; and
authorizing use of the free integrated service in a case where a second print request is transmitted from the web browser of the client to the print service via the free integrated service, wherein the print service transmits authorization information related to the second print request to the authentication/authorization service, and wherein the authorizing the use of the free integrated service includes:
determining, by the authentication/authorization service, whether the scope linked to the second authorization information is included in a scope for using the free integrated service; and based on a determination that the scope linked to the second authorization information is included in the scope for using the free integrated service, authorizing the use of the free integrated service without the authentication/authorization service verifying whether a role is assigned to the user information linked to the second authorization information.

* * * * *